US008683018B2

(12) United States Patent
Jansen et al.

(10) Patent No.: US 8,683,018 B2
(45) Date of Patent: Mar. 25, 2014

(54) SYSTEM AND METHOD OF TRACKING AND COMMUNICATING COMPUTER STATES

(75) Inventors: Peter Gerardius Jansen, Eindhoven (NL); Bob Janssen, Lage Zwaluwe (NL); Edgar Wouter Johannes Van Hoeijen, Bilthoven (NL)

(73) Assignee: Real Enterprise Solutions Development B.V., Den Bosch (NL)

( * ) Notice: Subject to any disclaimer, the term of this patent is extended or adjusted under 35 U.S.C. 154(b) by 305 days.

(21) Appl. No.: 12/991,446

(22) PCT Filed: May 14, 2008

(86) PCT No.: PCT/EP2008/055916
§ 371 (c)(1),
(2), (4) Date: Nov. 8, 2010

(87) PCT Pub. No.: WO2009/138121
PCT Pub. Date: Nov. 19, 2009

(65) Prior Publication Data
US 2011/0067027 A1    Mar. 17, 2011

(51) Int. Cl.
*G06F 15/177*    (2006.01)
(52) U.S. Cl.
USPC ............................ 709/220; 709/218; 709/224
(58) Field of Classification Search
USPC .............. 709/220–224, 201–202, 204–206, 709/217–219, 248
See application file for complete search history.

(56) References Cited

U.S. PATENT DOCUMENTS

| 6,795,966 | B1* | 9/2004 | Lim et al. ........................ 718/1 |
| 7,203,868 | B1 | 4/2007 | Evoy |
| 7,835,361 | B1* | 11/2010 | Dubrovsky et al. ........... 370/394 |
| 8,054,485 | B2* | 11/2011 | Berglin ........................ 358/1.15 |
| 2002/0062337 | A1* | 5/2002 | Minow ........................ 709/203 |
| 2004/0025171 | A1 | 2/2004 | Barinov |
| 2005/0038818 | A1 | 2/2005 | Hooks |
| 2007/0067586 | A1 | 3/2007 | Mikami |
| 2008/0022032 | A1 | 1/2008 | Nicholas |
| 2011/0321006 | A1* | 12/2011 | Kodosky et al. .............. 717/109 |

FOREIGN PATENT DOCUMENTS

| WO | 2007019711 | 2/2007 |
| WO | 2007075587 | 7/2007 |

OTHER PUBLICATIONS

Written Opinion of the International Searching Authority, European Patent Office, Munich, Germany, May 3, 2009.
International Search Report for corresponding foreign application PCT/EP2008/055916 mailed Mar. 5, 2009.

* cited by examiner

*Primary Examiner* — Huy D Vu
*Assistant Examiner* — Kuo T Chiang
(74) *Attorney, Agent, or Firm* — Steven M. Koehler; Westman, Champlin & Koehler, P.A.

(57) ABSTRACT

The invention relates to a system and method of tracking and communicating computing states of a first computer device for registering said computing states by a second computer device. The first computer device is connected to the second computer device and configured for assuming a plurality of successive computing states. Jobs are assigned to a different set of jobs each time a state transition has been detected. New sets are defined only when a state transition has been detected and typically not when a snapshot is made resulting in saving storage space.

14 Claims, 14 Drawing Sheets

SYSTEM AND METHOD OF TRACKING AND COMMUNICATING COMPUTER STATES

INCORPORATION BY REFERENCE

This application is a national stage application under 35 U.S.C. § 371 of PCT/EP2008/055916, filed May 14, 2008, published as WO 2009/138121A1 on Nov. 19, 2009, which application and publication is incorporated herein by reference and made a part hereof in its entirety.

FIELD OF THE INVENTION

The invention relates to the field of computers. More specifically, the invention relates to the a system and method of tracking and communicating computing states of a first computer device for registering said computing states by a second computer device, connected to the first computer device, wherein the first computer device is configured for assuming a plurality of subsequent computing states.

BACKGROUND OF THE INVENTION

In the field of computers, programs are known that allow to instruct one or more first computer devices to execute one or more tasks from a remote second computer device. An example of such a program is RES Wisdom®, marketed by the applicant.

One or more of such tasks to be executed by the first computer device(s) are often referred to as a job. After execution of a job by one or more of the first computer devices, the state of a first computer device is changed and the job is registered at the second computer device in a database in order to enable an operator to retrieve a job history for one or more of the first computer devices. Such a job history provides valuable information for an operator e.g. in case of operating problems of the first computer device(s). Therefore, it is important that the database allows retrieval of a job history that is an accurate representation of the true state of the first computer device.

By executing various jobs, the states of the first computer device change from a first state to a second state to a third state on to a present state. Nowadays it has become possible to make snapshots of particular states of the first computer device in order to record such a state.

An operator or user of the first computer device may desire the device to return from the present state to a previous state that was recorded by means of the snapshot technique. The operator or user is allowed to switch back and forth between states of the computer by applying snapshots. Such switching may e.g. be applied for testing purposes.

A simple example may illustrate that switching from a present state to a previous state (a state transition) at the first computer device complicates accurate registering of the job history of the first computer device by a second computer device.

Assume that a software agent on the first computer device executes jobs A, B and C. These jobs are also recorded in a database of the second remote computer device. A snapshot S1 at the first computer device is made after execution of job C. Subsequently, jobs D and E are performed, such that the job history of the first computer device is A, B, C, D, E. The registered job history in the database also reads A, B, C, D, E and thus corresponds to the actual state of the first computer device. Now a snapshot S1 is applied which triggers a state transition of the first computer device back to state A, B, C. The registered history, however, still reads A, B, C, D, E. If the software agent on the first computer subsequently executes a job F, the registered history is A, B, C, D, E, F, while the actual state of the first computer device is A, B, C, F. If snapshot S1 is applied once more, the first computer device has a state A, B, C, whereas the job history in the database is still A, B, C, D, E, F.

Consequently, there exists a need in the art to provide a method and system of tracking and communicating computing states from a first computer device to a second computer device such that the state of the first computer device is accurately known at the second computer device despite a state transition to a previous state for the first computer device.

SUMMARY OF THE INVENTION

The applicant proposes a method of tracking and communicating computing states of a first computer device for registering said computing states by a second computer device. The first computer device is connected to the second computer device and configured for assuming a plurality of successive computing states. One or more computing states of the first computer device are tracked and communicated to the second computer device. These computing states, including a previous computing state, are assigned to a first set of computing states. The first set of computing states is identified by a first set identifier. When the first computer device returns from a present computing state to the previous computing state, this state transition is detected at the first computer device. In response to detecting the state transition, the first computer device requests and receives a momentary extreme set identifier of a sequence of set identifiers from the second computer device. The first computer device changes the momentary extreme set identifier to a next momentary extreme set identifier of the sequence of set identifiers. Further computing states after the state transition are now assigned to a second set of computing states, which second set is identified by the next momentary extreme set identifier. These further computing states of the second set are communicated to the second computer device under the next momentary extreme set identifier in combination with the first set identifier that is indicative of the parent set of the second set.

The applicant also proposes a computer program and a computer readable medium comprising such a computer program for executing the method of the invention.

Furthermore, a computing state registering system comprising a first computer device and a second computer device is proposed. The first computer device is configured for assuming a plurality of successive computing states and is connectable or connected to the second computer device. The first computer device comprises:

- a communication module configured for communicating to said second computer device, one or more computing states of said first computer device as a first set of computing states, said first set containing a previous computing state and being identified by a first set identifier;
- a detector configured detecting a state transition from a present computing state to the previous computing state of said first computer device;
- a requesting module configured for requesting by said first computer device a momentary extreme set identifier of a sequence of set identifiers in response to detecting said state transition;
- a receiver configured for receiving said momentary extreme set identifier from said second computer device;

a processing module programmed for changing said momentary extreme set identifier to a next momentary extreme set identifier of said sequence of set identifiers;

a processing module programmed for assigning further computing states of said first computer device to a second set of computing states, said second set being identified by said next momentary extreme set identifier and;

a transmitter configured for transmitting said next momentary extreme set identifier, and said first set identifier of said first set to said second computer device; and a communication module configured for communicating said further computing states of said second set to said second computer device.

Finally, the applicant also proposes a first computer device and a second computer device for (use in) such a system.

It should be appreciated that a computing state may be communicated to the second computing device by transmitting one or more identifiers to the second computing device that are indicative of one or more tasks executed by the first computer device and resulting or having resulted in such a computing state. A computing state is characterized by the kind and sequence of task or tasks performed to arrive at such a computing state. The present computing state may or may not be part of the first set of computing states.

The applicant has found a method and system wherein jobs are assigned to a different set of jobs each time a state transition has been detected. New sets are defined only when a state transition has been detected and typically not when a snapshot is made (occurring more frequently), resulting in saving storage space. In order to be able to assign a set identifier to a new set after a state transition, the most extreme set identifier at that moment is obtained from an external system and changed to a next most extreme set identifier for the new set. By applying new sets for computing states upon detection of backward state transitions and communicating these computing states to the second computer device, a multi-dimensional state history can be obtained at the second computer device. Instead of a linear sequence of states, sets of states are obtained wherein one or more sets may have one or more branches to other state sets. Consequently, an operator of the second computer device may retrieve the exact state of the first computer device despite one or more backward state transitions at the first computer device.

It should be noted that the method and system are also applicable for state transitions obtained otherwise then applying snapshots, such as imaging and write filters.

The embodiment of claim 2 provides the advantage of registering jobs executions at the first computer device by a job sequence number (JSN) and a unique job identifier. A job sequence numbers and a unique job identifier may be transmitted to the second computer device in order to communicate a computing state from the first computer device to the second computer device.

The embodiment of claim 3 provides the advantage of registering the last job sequence number (LJSN) of a set at the second compute device.

The embodiment of claims 4-6 provide suitable mechanisms for detecting a state transition from a present state to a previous state. The JobGUID (a unique job identifier) provides a suitable comparing identifier.

The embodiment of claim 7 provides the advantage of a locally available set identifier (PCSN) of a previous set that links with a new set.

The embodiment of claim 8 enables an overview of change paths from a predetermined computing job.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figures 1A, 1B:
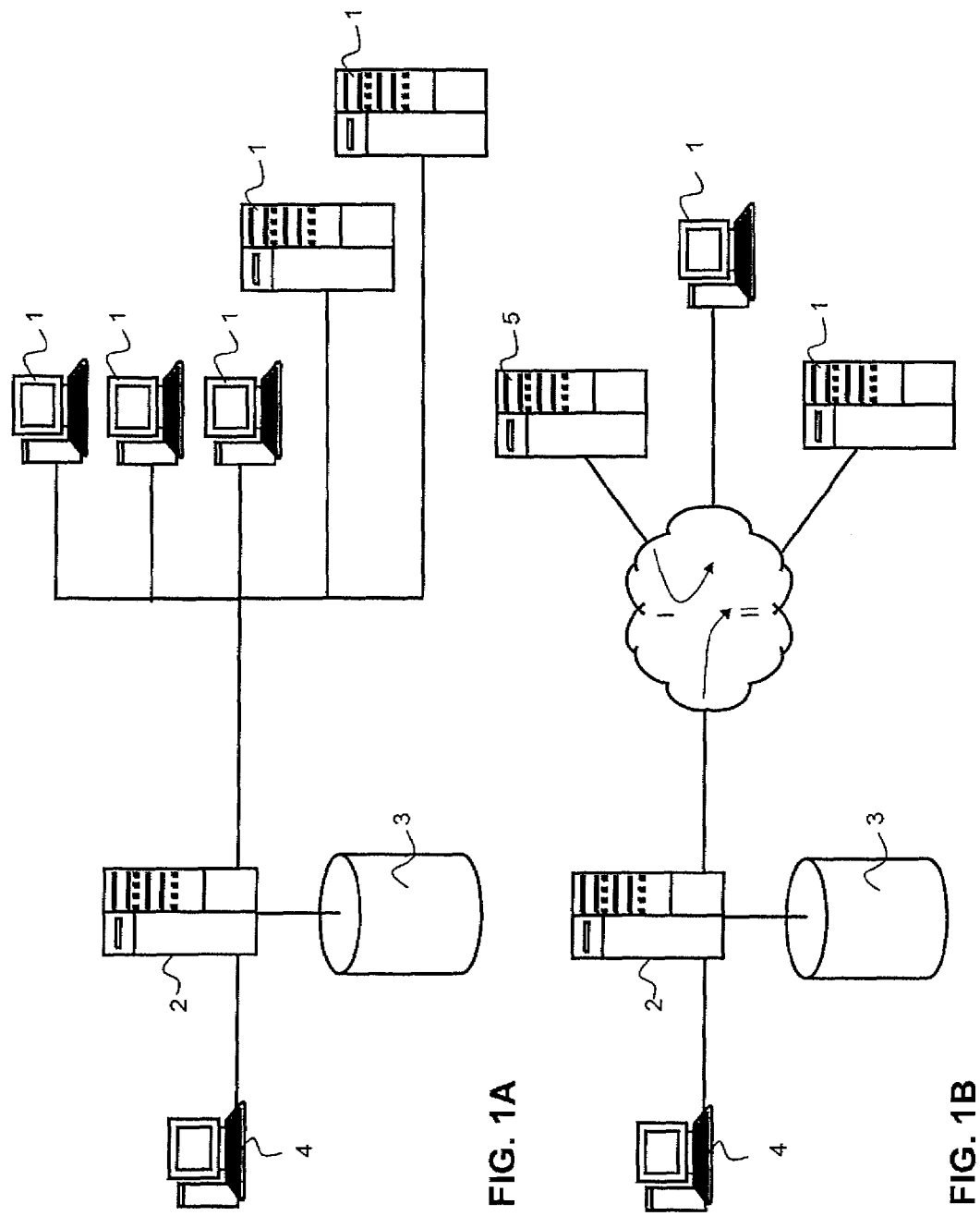
FIGS. 1A and 1B provide schematic illustations of systems according to embodiments of the invention.

FIGS. 1A and 1B provide schematic illustrations of a system comprising first computer devices 1 and a second computer device 2 having access to a database 3. It is noted that second computer device 2 may also be a system of multiple computer devices and that database 3 may comprise a plurality of databases. Second computer device 2 can be controlled from a console 4 and is connected to the first computer devices 1 via a network.

In FIG. 1A, the first computer devices 1 are workstations and servers connected directly to the second computer device 2. In FIG. 1B, the first computer devices 1 also comprise a server and a workstation. The server 1 and workstation 1 frequently (e.g. daily) receive a clean image from a further server 5, indicated by arrow I. The image may subsequently be adapted from the second computer device 2, as indicated by arrow II.

It is noted that various other (middleware) devices (not shown) may be present between the second computer device 2 and the first computer devices 1.

Figure 2:
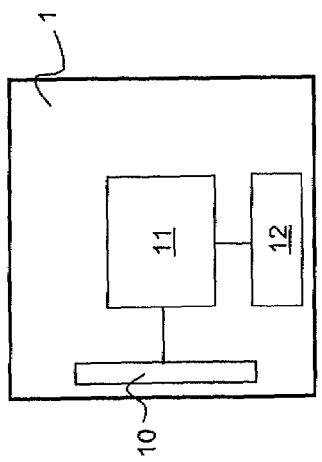
FIG. 2 provides a schematic illustration of a first computer device according to an embodiment of the invention.
Figure 3:
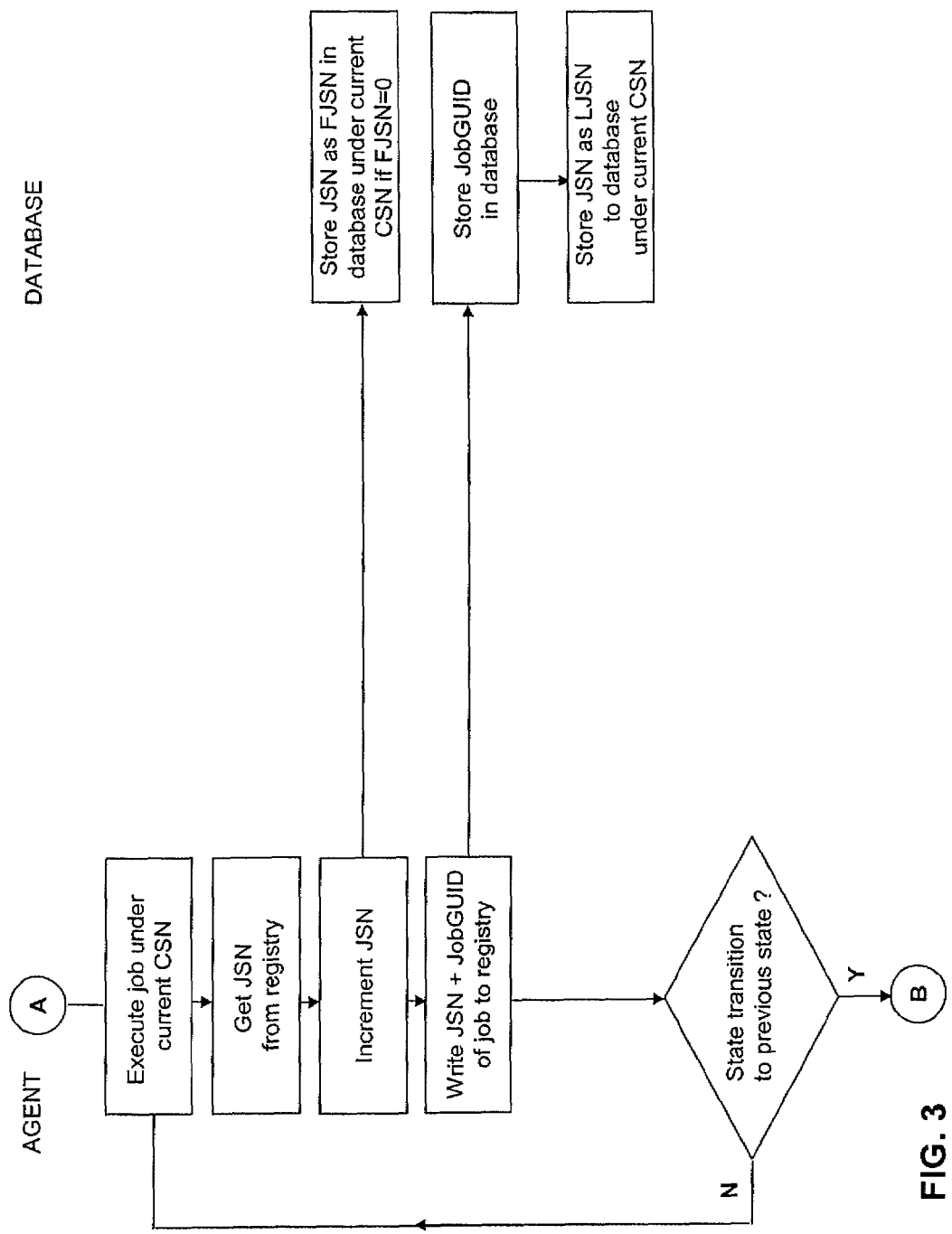
FIG. 3 is a flowchart of a method according to an embodiment of the invention.
Figure 3:
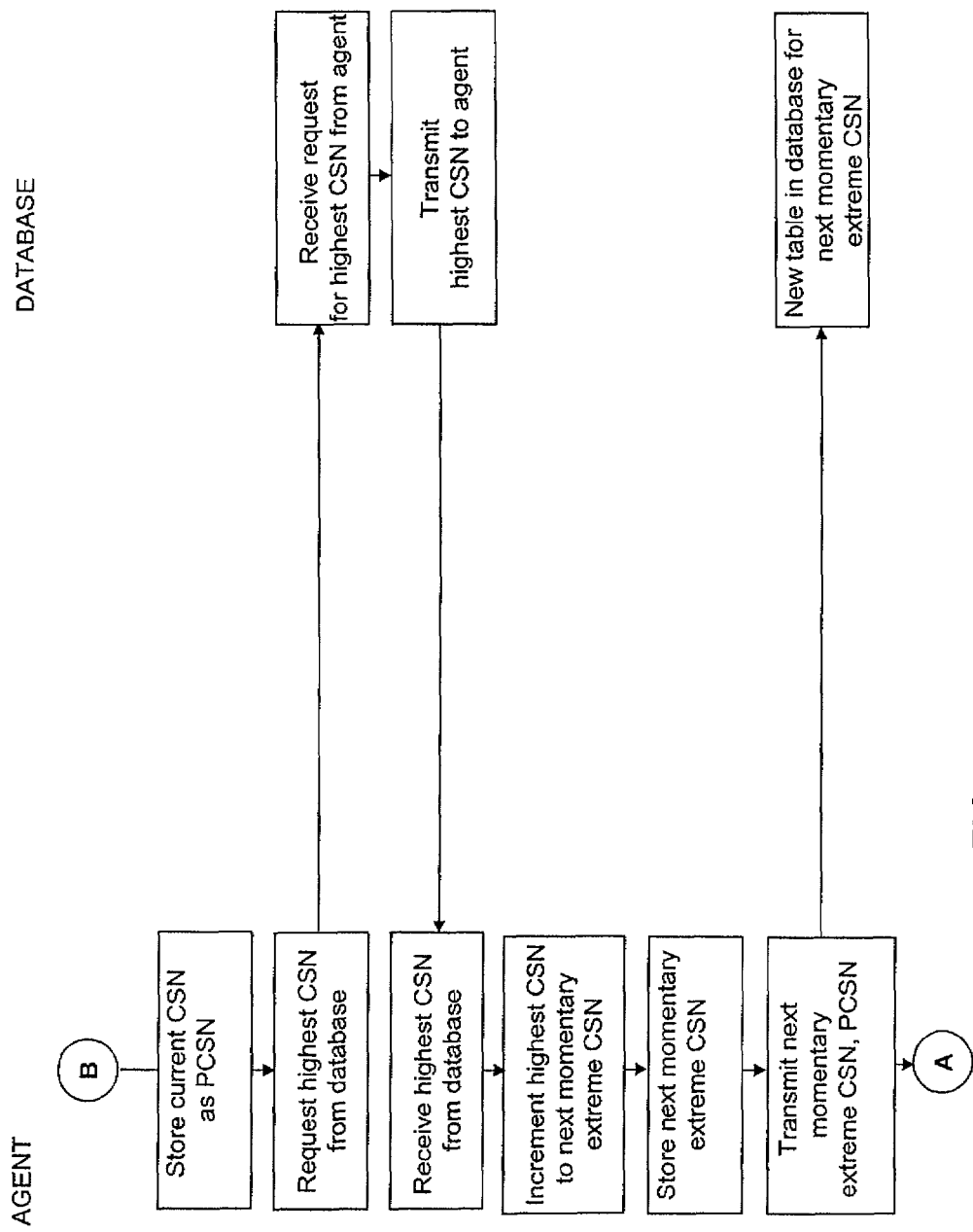
Figure 4:
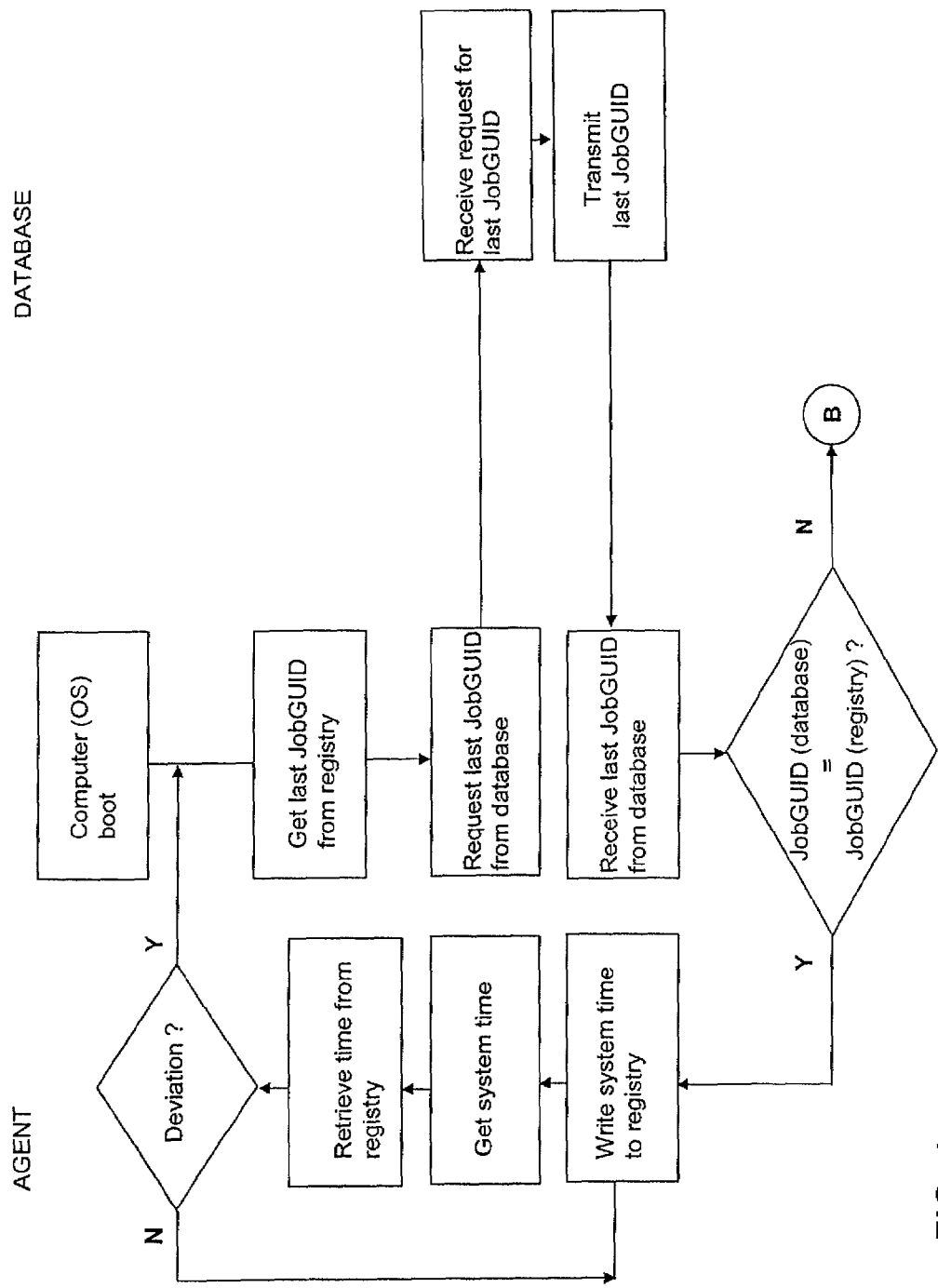
FIG. 4 is a flowchart of a method of detecting a state transition from a present computing state to a previous computing state according to an embodiment of the invention.

A very schematic illustration of a first computer device 1 is depicted in FIG. 2. The first computer device 1 comprises a network adapter 10 to transmit information to and receive information from the second computer device 2. The first computer device 1 further comprises a processor 11 configured for running an agent for executing the method according to an embodiment of the invention as depicted in FIGS. 3 and 4. Moreover, the first computer device 1 has a storage means 12. Storage means 12 may comprise various types of memory, including a registry.

First computer devices 1 may be distinguished by the second computer device 2 on the basis of e.g. unique AgentGUIDs. The AgentGUID of a first computer device 1 is known at the second computer device 2 and is transmitted from the first computer devices 1 each time data may transmitted to the second computer device 2 in order to identify the source of the of the data, i.e. the first computer device 1 having transmitted the data.

The first computer devices 1 are configured to execute jobs that may e.g. be received from the second computer device 2. As a result of the execution of the jobs, the states of the first computer devices 1 change. Each of the first computer devices 1 is capable of making a snapshot of its state at a particular moment in time. Snapshots may be made frequently, e.g. once every second, in a manner known to the person skilled in the art. By making a snapshot, the state of the first computer is recorded at that moment and stored for later retrieval at the first computer device 1 or on a server. If such a snapshot is applied, the state at the moment of application of the snapshot (the present state) is changed to a state of the desired moment in time at which a snapshot was made (the previous state). The application of a snapshot thus results in a state transition, while making a snapshot does only record a state at a particular moment.

FIGS. 3 and 4 provide flow charts illustrating a method of tracking computing states at a first computer device 1 and communicating these computing states to the second computer device 2 such that, despite possible backward transitions of the state of the first computer device 1, the actual state of the first computer device 1 may be retrieved from the database 3 of the second computer device 2. The left-hand side of the FIGS. represents the first computer device 1 and the software agent running on this device, whereas the right-hand side represents the database 3 of the second computer device 2.

The process starts by executing one or more jobs of a particular set, identified by a set identifier CSN (the current CSN), each job resulting in a computing state of the first computer device 1 to be communicated to the second computer device 2. Jobs are uniquely characterized by globally unique JobGUIDs. Upon execution of a job, a job sequence number JSN is obtained from the registry 12 of the first computer device. Job sequence numbers are successive numbers that may be used various times at the first computer for jobs of different sets. The JSN is incremented to a successive JSN and stored in the registry 12 of the first computer device 1 in combination with the associated JobGUID. In order to communicate a computing state to the second computer device 2, the successive JSN and the JobGUID are also transmitted to the database 3, wherein the successive JSN is stored as a last JSN (LJSN) for the set. The successive JSN is also stored as a first JSN (FJSN) in the database 3 if that JSN was the first JSN received for the present set.

The above steps are performed as a loop each time that a job is executed by the first computer device 1 and, accordingly, a particular computing state is assumed by the first computer device 1 which should be communicated to the second computer device 2. If at a certain moment in time, wherein the first computer is in a present state, a transition to a previous state is detected, the loop is left at B. The detection of a state transition (e.g. as a result of the application of a snapshot) will be explained below in further detail with reference to FIG. 4.

When a state transition is detected at the first computer device 1, the set identifier CSN of the jobs executed before the state transition is stored in the registry 12 as a parent set identifier (PCSN). Moreover, the highest CSN at that moment for that first computer device 1 is requested from the database 3 and subsequently obtained in order to create a new set for jobs executed after the state transition. Of course, the requested CSN may also e.g. be a lowest CSN or another momentary extreme set identifier. The identifier of the new set is obtained by incrementing the received highest CSN to a next momentary extreme CSN and serves as a set identifier for the new set of jobs executed after the state transition. Jobs performed after the state transition are now assigned to the newly created set by using the new set identifier and transmitting jobs under this set identifier to the database 3. The PCSN is also communicated to the database 3 in order to indicate the parent set of the newly created set. In the database 3, a new table is created for the new set upon instruction of the agent on the first computer device 1 for that AgentGUID. The next momentary highest set identifier is also stored locally in the registry 12.

An embodiment for detecting a state transition of the first computer device 1 from a present state to a previous state is described now with reference to FIG. 4. FIG. 4 illustrates two methods for detecting such a backward state transition used in combination.

When a job has been executed on the first computer device 1, the JobGUID of such a job is stored in the registry 1. A (re)boot of the (operating system of the) first computer device 1 may trigger retrieval of the latest JobGUID stored in the registry 12 of the first computer device 1 and a request to the database 3 for the latest JobGUID stored in the database. Upon receipt of the latest JobGUID from the database 3, this JobGUID may be compared with the JobGUID obtained from the registry 12.

If the JobGUIDs are different, a state transition has occurred resulting in the formation of a new set of jobs under a new set identifier as explained above with reference to FIG. 3.

If the JobGUIDs are identical, the first computer device 1 is monitored for state transitions during operation of the first computer device 1 by making use of the system time of the first computer device 1. The system time is read and written to the registry 12. Subsequently, after a particular time interval, the system time is read again and compared with the stored system time. If the sum of the stored system time and the time interval deviates from the newly read system time, a state transition may have occurred and the JobGUIDs in the registry 12 and the database 3 are compared in a manner described previously.

FIGS. 5A-5I provide diagrammatic representations of the method shown in FIG. 3 during successive stages of job executions and state transitions. The processor 11 of the first computer device runs the application (an agent) performing the steps on the left hand side of FIG. 3. The present example is for a single first computer device 1, such that a reference to the AgentGUID is omitted. In FIGS. 5A-5I, the upper bar is a pictorial representation of the contents of the registry 12 (the series of sequential jobs resulting in a present computing state). The lower bar indicates a pictorial representation of the jobtable of the database 3. The right-hand rectangle indicates a pictorial representation of a changeset table in the database 3 that allows retrieving the present computing state of the first computer device 1.

It is assumed that the first computer device 1 has performed zero jobs and no stage transitions. In this state, the following variables apply: CSN=1 (set identifier of the first set); PCSN=0 (there is not yet a parent set of the first set) and JSN=0 (no jobs have yet been executed on the first computer device 1). The following notation will be used (CSN.PCSN.JSN). The initial situation is thus represented by 1.0.0.

Figure 5A:
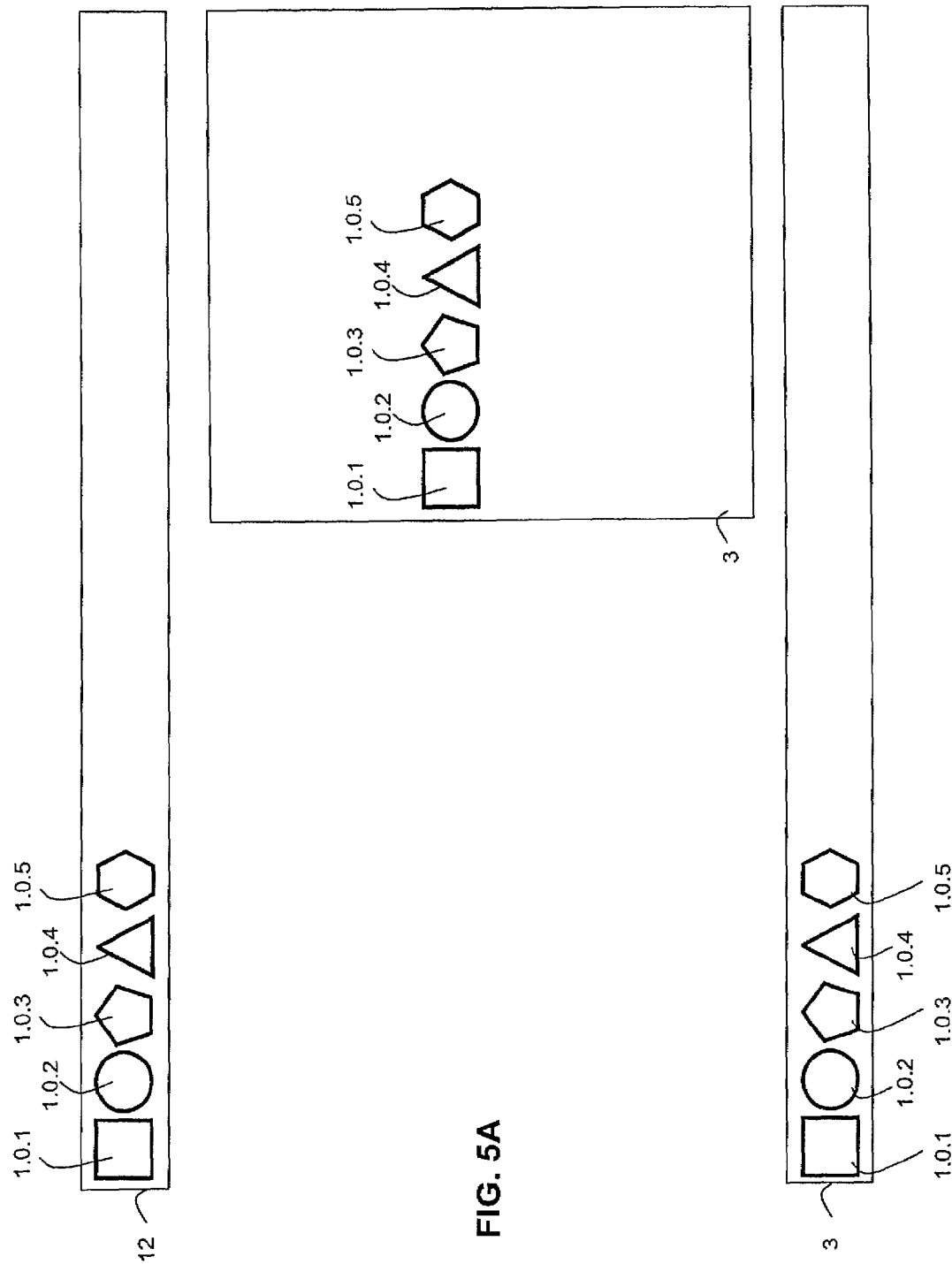
FIGS. 5A-5I provide diagrammatic representations of the method shown in FIG. 3.
Figure 5B:
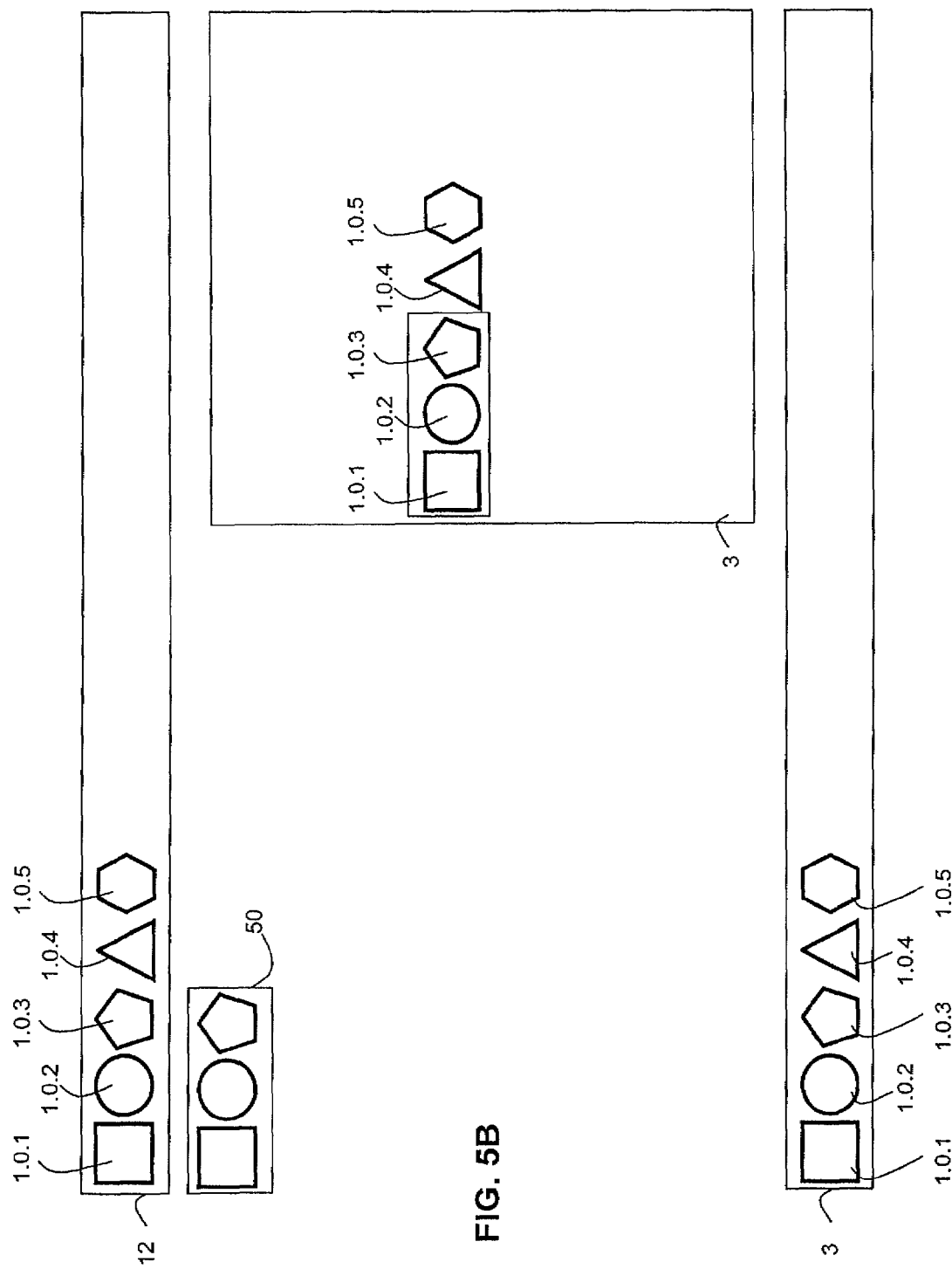
Figure 5C:
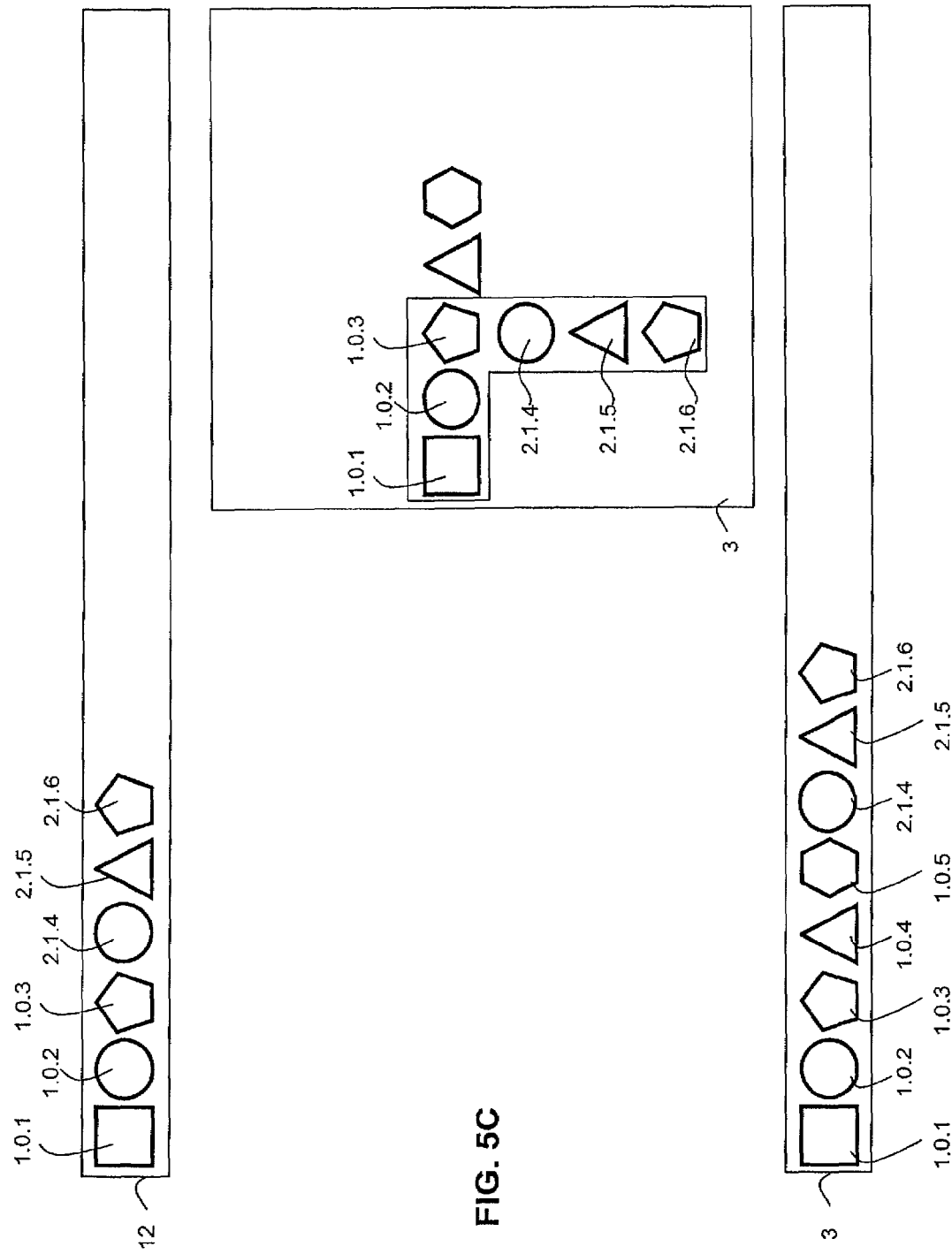

Jobs will now be executed on the first computer device 1 and be added to the first set with CSN=1. Each job results in a successive computing state of the first computer device 1. The sequence number JSN of the first job is also stored in the database 3 as the first job sequence number FJSN. The sequence number of the last job for CSN is also stored in the database 3 as LJSN. After the execution of five jobs 1.0.1 1.0.2 1.0.3 1.0.4 1.0.5.

represents the present computing state of the first computer device 1 which is also reflected in job table and the changeset table of the database 3, as illustrated in FIG. 5A.

It is now assumed that a state transition is made from a present state to a previous state at which a snapshot was made. The present state was the state after execution of job 5 of set CSN=1. The previous state to which the transition is made is assumed to be the state between JSN=3 and JSN4, as indicated by state transition bar 50 in FIG. 5B. In this case, the present state and the previous state are both part of the first set with CSN=1. The state transition is detected in a manner as described with reference to FIG. 4. The highest CSN is requested and received from the database 3, i.e. CSN=1. Subsequently, the highest CSN is increased to CSN=2 as a set identifier for the new set of jobs to be executed after the state transition. The parent CSN (PCSN) is retrieved from registry 12, i.e. PCSN=1. The first job of the new set will then be 2.1.4. After execution of three further jobs, the present computing state is as follows:
1.0.1 1.0.2 1.0.3
   2.1.4 2.1.5 2.1.6
From FIG. 5C, it can be seen that, while the job table of database 3 still reflects the conventional job history without taking account of the state transition, the changeset table shows a branch from the first set to the second set at the job with the last job sequence number that resulted in the previous state to which the state transition was made.

Figure 5D:
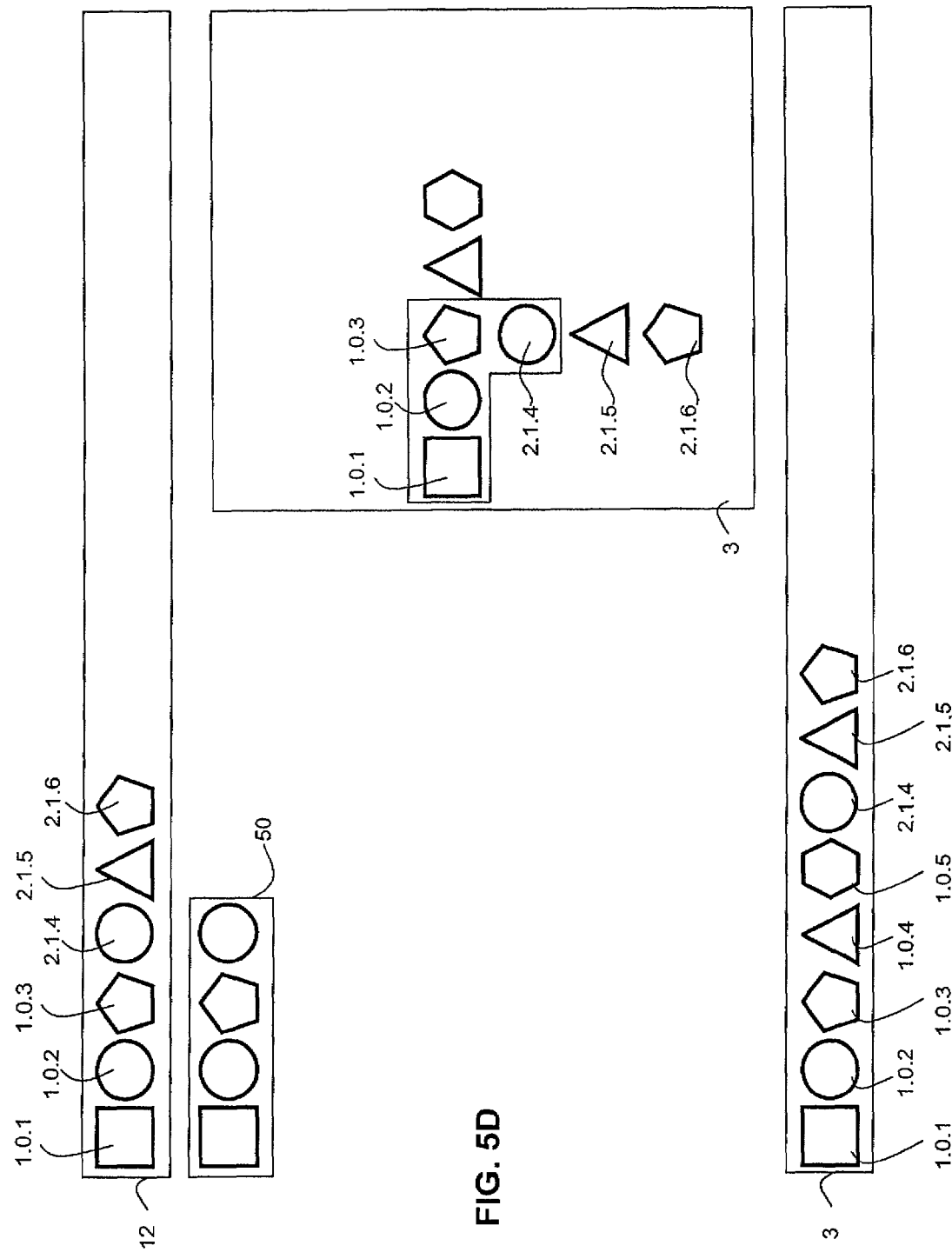
Figure 5E:
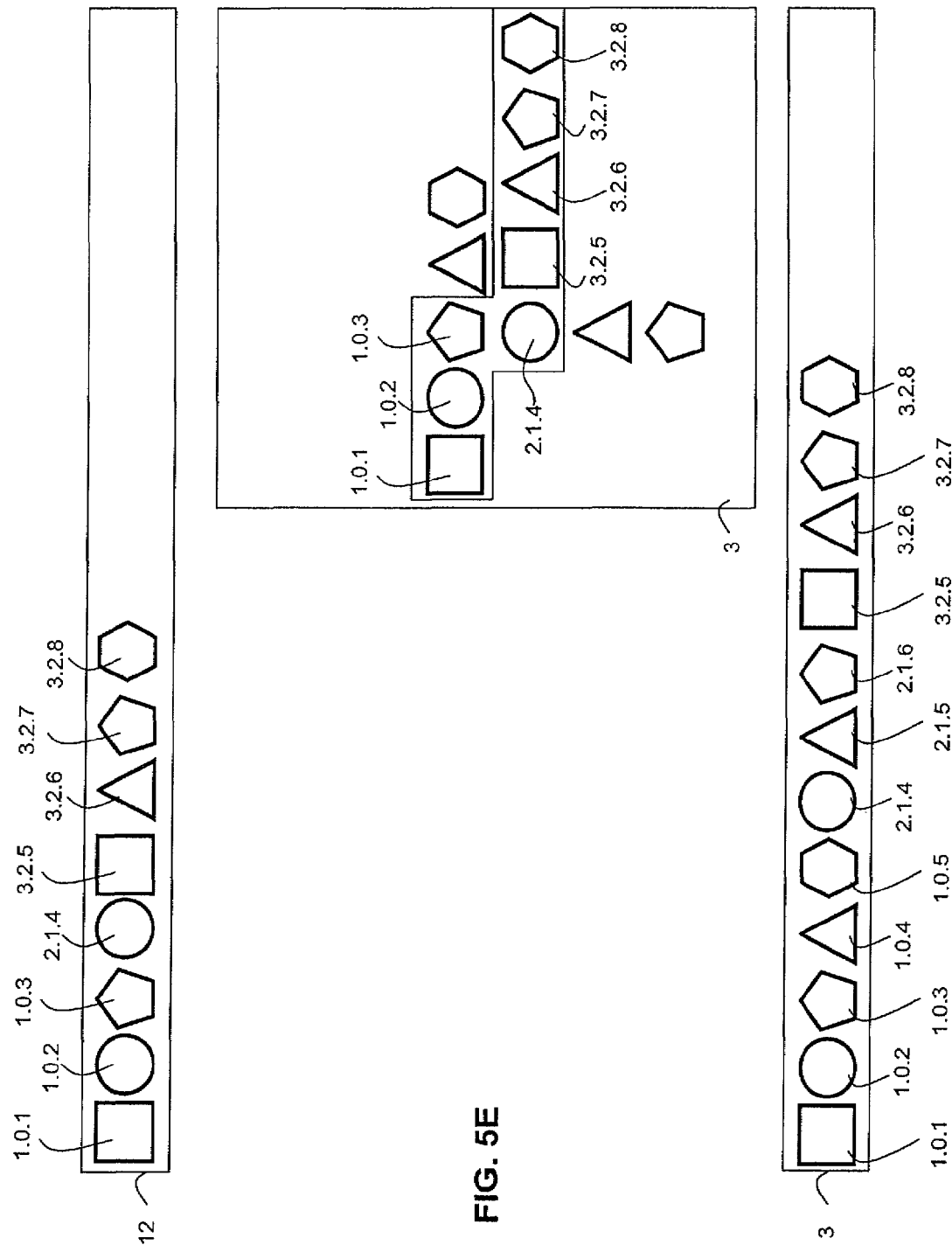

Subsequently, a state transition, indicated by the state transition bar 50 in FIG. 5D, is performed from the state after 2.1.6 (present state) to a state between JSN=4 and JSN=5 (previous state) of the set (such that the present state and previous state again are states of the same set with CSN=2). Again the state transition is detected at the first computer device 1, the highest CSN (CSN=2) is received from database 3, the PCSN is retrieved from registry 12 and a new set is created with set identifier CSN=3 in the changeset table of the database 3, as indicated in FIG. 5E. The parent of the new set was indicated by CSN=2, so PCSN=2 and a branch with jobs of the new set is made from set of the last job that was responsible for arriving at the previous state (2.1.4) to the new set. Further jobs are executed under the new set identifier CSN=3 to arrive at
1.0.1 1.0.2 1.0.3
   2.1.4
      3.2.5 3.2.6 3.2.7 3.2.8
as the present computing state of the first computer device 1.

Figure 5F:
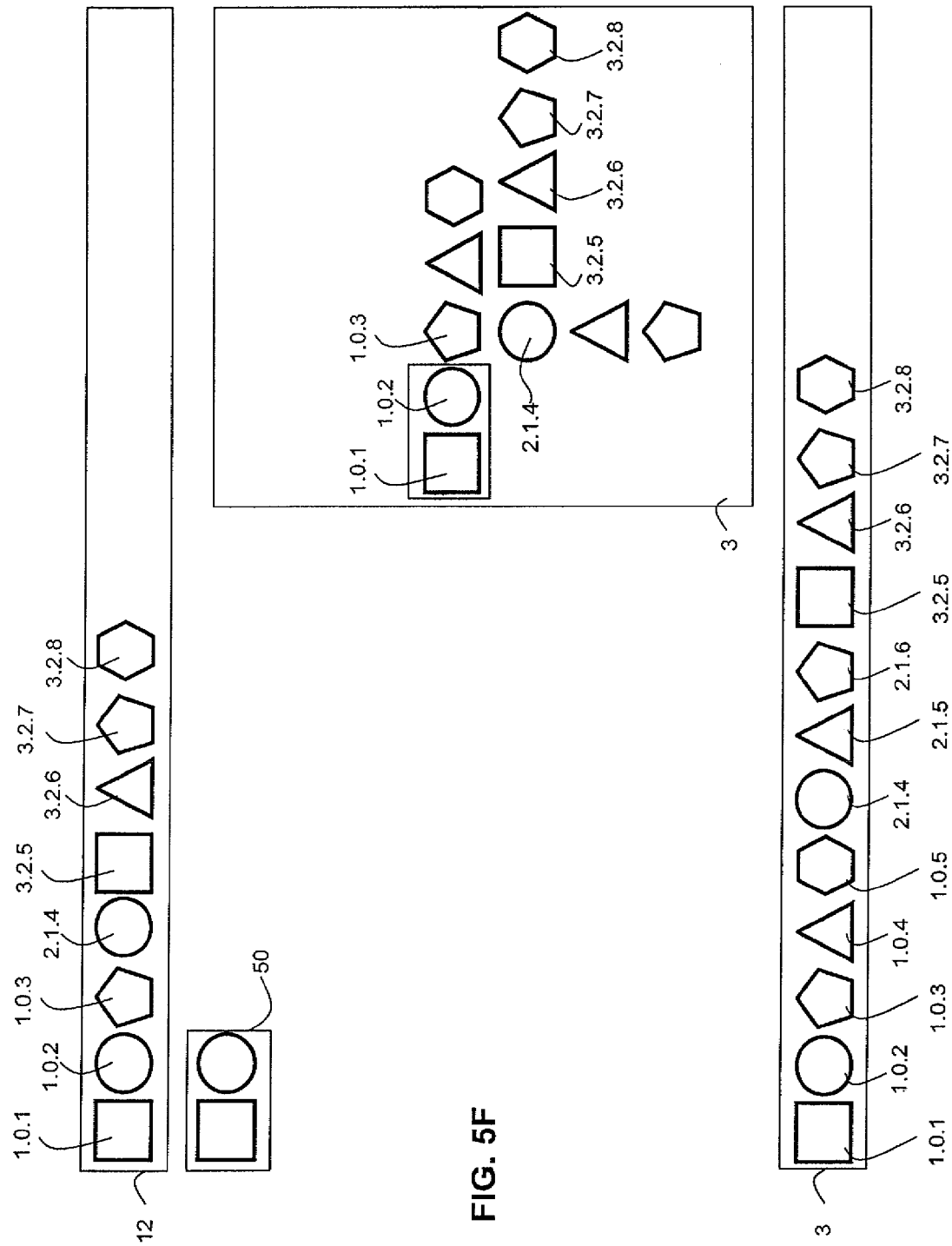

A further state transition is detected, indicated by state transition bar 50 in FIG. 5F, from the above present state to a previous state of the first set with CSN=1, viz. between jobs JSN=2 and JSN=3. The present state and the previous state are not states of different sets.

Figure 5G:
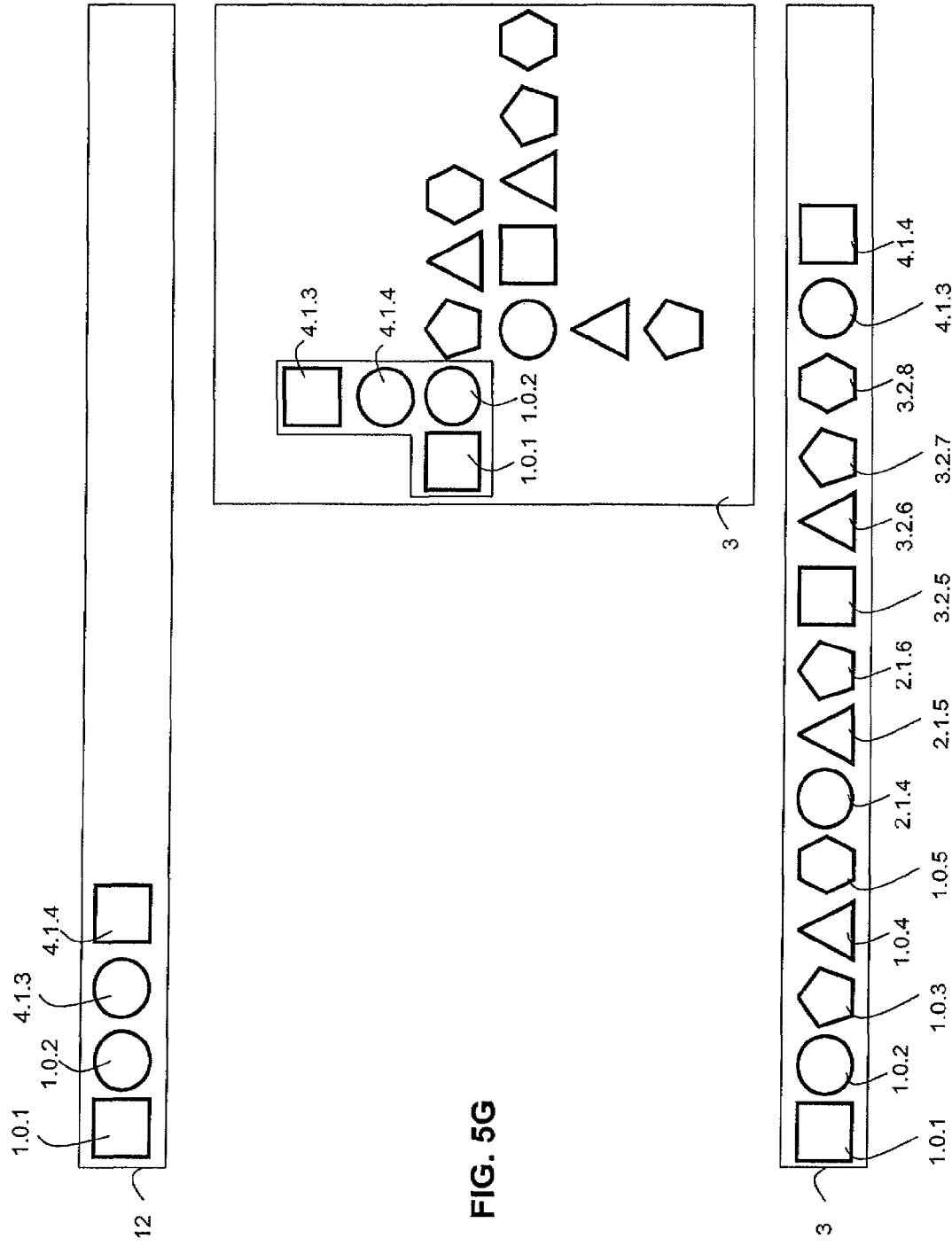

The state transition is detected and two jobs are executed under a new set identifier CSN=4, obtained by increasing the highest momentary set identifier CSN=3, indicated in FIG. 5G. The present computing state of the first computer device 1 then reads:
1.0.1 1.0.2
   4.1.3 4.1.4
Indeed, the changeset table indicates that the new set of jobs branches from the first set of jobs at the last job that was responsible for the previous computing state of the first computer device 1.

Figure 5H:
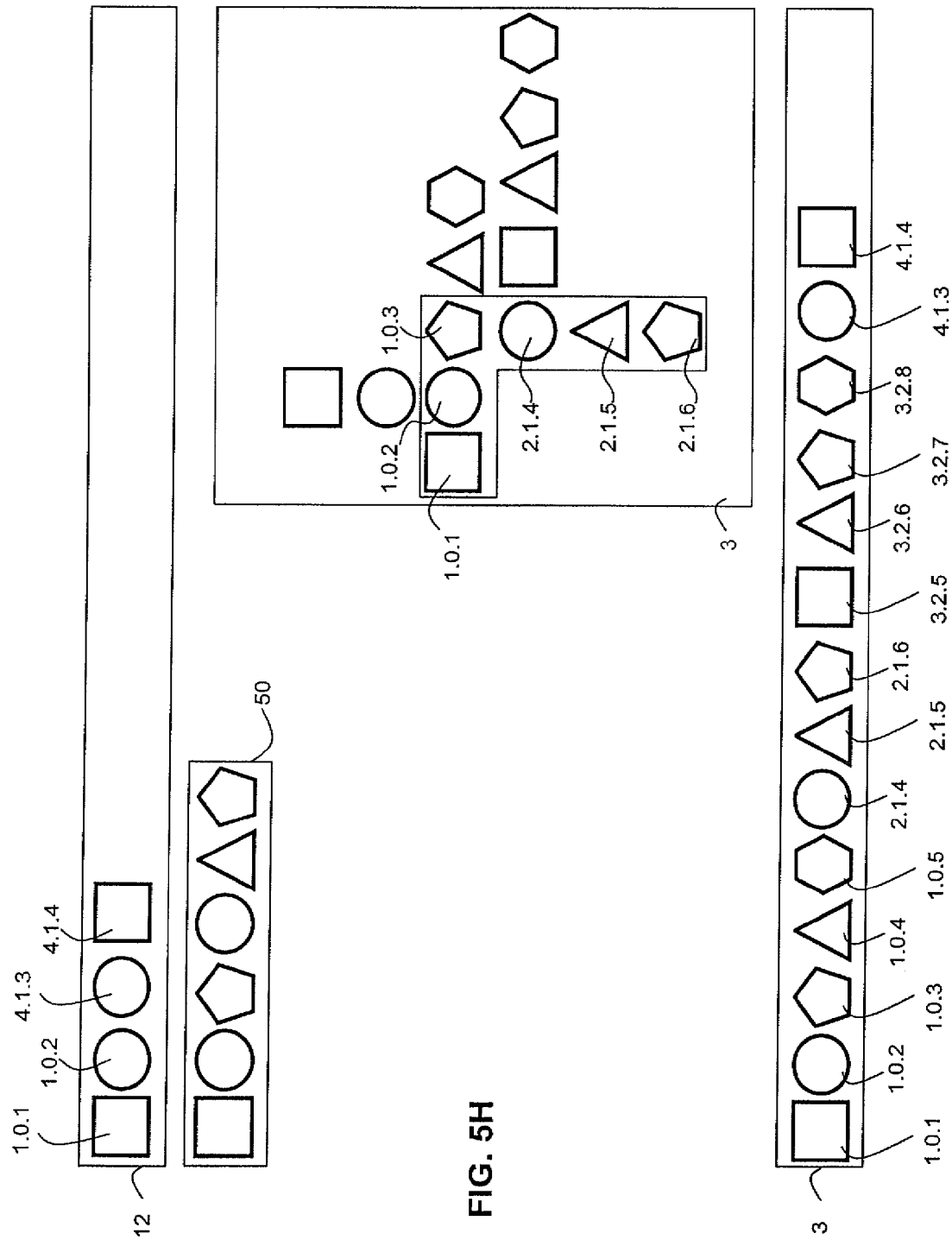
Figure 5I:
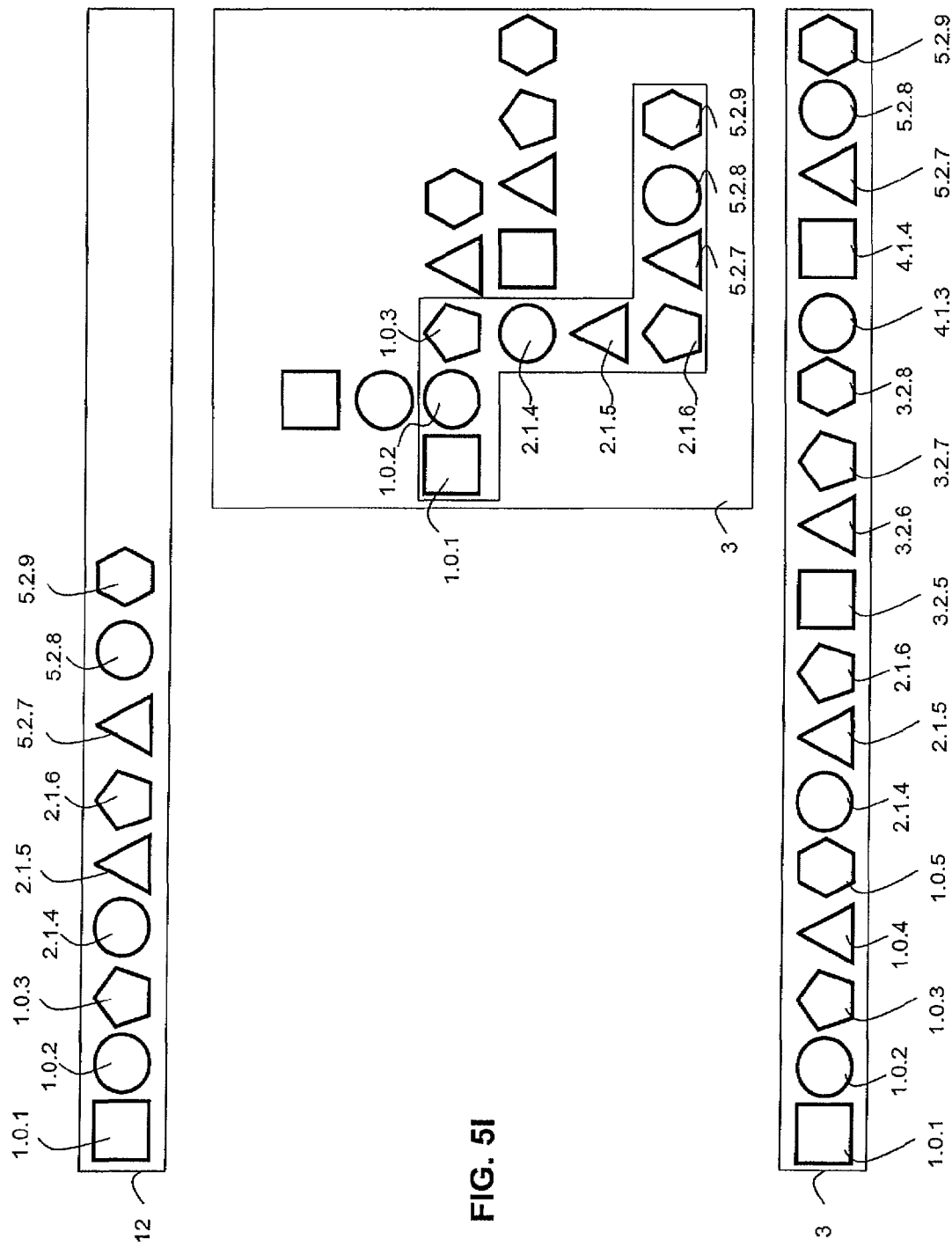

As shown in FIG. 5H, a further state transition (indicated by state transition bar 50) can be made from the above present computing state to a previous computing state after the job with JSN=6 of the set with set identifier CSN=2. The state transition is detected and a new set identifier CSN=5 is assigned to three new jobs after the state transition, as indicated in FIG. 5I. Since PCSN=2, the present state of the first computer device is:
1.0.1 1.0.2 1.0.3
   2.1.4 2.1.5 2.1.6
      5.2.7 5.2.8 5.2.9
The changeset table of database 3 indeed now shows a branch from the second set that contained the previous state for the new set with CSN=5 at the last job responsible for this previous state.

The database 3 now comprises the following tables:
tblJobs (CSN.JSN)
1.1-1.2-1.3-1.4-1.5-2.4-2.5-2.6-3.5-3.6-3.7-3.8-4.3-4.4-5.7-5.8-5.9
This table reflects the 'normal' history.
The further table is tblChangeSets:

| CSN | PCSN | FJSN | LJSN |
|-----|------|------|------|
| 1 | 0 | 1 | 5 |
| 2 | 1 | 4 | 6 |
| 3 | 2 | 5 | 8 |
| 4 | 1 | 3 | 4 |
| 5 | 2 | 7 | 9 |

The data collected in the database 3 of the second computing device may be used from the console 4 to obtain various types of information for the first computer device 1. The following, non-limitative, examples may be envisaged.

Of course, the present computing state of the first computer device 1 can be obtained, despite various state transitions at the first computer device 1. As an example, if the ninth job (JSN=9) from the fifth set (CSN=5) is taken as the starting point, the following pseudo code may be used to obtain the present state:

```
lngCSN=5
lngJSN=9
lngJSN:=lngJSN+1
DO
    SELECT * FROM tblJobs
    WHERE CSN = lngCSN AND JSN < lngJSN
    ORDER BY JSN DESC
    FOR EACH RETURNED ROW: ListView.Add [JobInfo]: NEXT
    SELECT * FROM tblChangeSets WHERE CSN = lngCSN
    lngCSN = PCSN: lngJSN = FJSN
LOOP UNTIL lngCSN = 0
```

The result from executing this algorithm in the database 3 is:
5.9-5.8-5.7-2.6-2.5-2.4-1.3-1.2-1.1

Furthermore, the amount of state transitions (e.g. applied snapshots) may be determined, using the following algorithm.

```
SELECT * FROM tlbChangeSets WHERE CSN > 1
FOR EACH RETURNED ROW: ListView.Add [ChangeSetInfo]: NEXT
```

As a final example, a particular job may be selected and all the job sequences that followed that job may be determined, using the following algorithm. For this algorithm, it is required that the job sequence numbers of connected sets are sequential at the job that connects the sets.

```
Suppose that CSN = 2 and JSN = 4, such that
lngCSN =2: lngJSN = 4
PossibleEndPoints = GetEndPoints(lngCSN, lngJSN)
FOR EACH PossibleEndPoint
    ListView.Add View1 (PossibleEndPoint.CSN, PossibleEnd-
Point.JSN, lngCSN,lngJSN)*
NEXT
---
FUNCTION GetEndPoints(lngCSN, lngJSN) AS EndPoints
    EndPoints.Clear
```

-continued

```
        ysnEndPoint = True
        'Find endpoint for this Change Set
        SELECT * FROM tblChangeSets
        WHERE CSN = lngCSN
        EndPoints.Add CSN + "." + LJSN
        'Look for childs
        SELECT * FROM tblChangeSets
        WHERE PCSN = lngCSN AND FJSN > lngJSN
        FOR EACH RETURNED ROW
            EndPoints.Add fstrGetEndPoints(CSN, lngJSN)
        NEXT
        RETURN EndPoints
    END FUNCTION
```

The result of executing the algorithm is:
2.5-2.6
3.5-3.6-3.7-3.8
2.5-2.6-5.7-5.8-5.9
Thus, all job sequences after 2.4 result from running the algorithm.

It should be appreciated that the data in database 3 may be used to obtain further information.

The invention claimed is:

1. A computer-implemented method of communicating computing states of a first computer device for registering said computing states by a second computer device, connected to said first computer device, said first computer device being configured to assume a plurality of successive computing states, said method comprising the steps of:
communicating one or more computing states from said first computer device to said second computer device as a first set of computing states, said first set being identified by a first set identifier and containing a previous computing state;
detecting by said first computer device a state transition from a present computing state to said previous computing state of said first computer device;
requesting by said first computer device a momentary extreme set identifier of a sequence of set identifiers in response to detecting said state transition;
receiving at said first computer device said momentary extreme set identifier from said second computer device;
changing at said first computer device said momentary extreme set identifier to a next momentary extreme set identifier of said sequence of set identifiers;
assigning further computing states of said first computer device to a second set of computing states, said second set being identified by said next momentary extreme set identifier;
transmitting said next momentary extreme set identifier, and said first set identifier of said first set to said second computer device; and
communicating said further computing states of said second set to said second computer device.

2. The method according to claim 1, wherein said computing states of said first set are obtained by executing jobs on said first computer device, each of said jobs being identified by a unique job identifier, the method further comprising the steps of:
retrieving a job sequence number from said first computer device;
incrementing said job sequence number to a successive job sequence number for a job executed on said first computer device;
storing said successive job sequence number and an associated unique job identifier at said first computer device.

3. The method according to claim 2, further comprising the steps of:
receiving said successive job sequence number at said second device;
storing said successive job sequence number at said second computer device as a momentary extreme job sequence number for said first set.

4. The method according to claim 1, wherein said step of detecting said state transition comprises the steps of:
booting said first computer device;
retrieving an identifier of said previous computing state from said first computer device;
receiving an identifier of said present computing state from said second computer device
comparing said identifiers of said previous computing state and said present computing state;
signaling a state transition if said identifiers of said previous computing state and said present computing state are different.

5. The method according to claim 4, wherein said identifiers of said previous computing state and said present computing state are defined by a first unique job identifier (first JobGUID) of a first job bringing said first computer device in said previous computing state and a second unique job identifier (second JobGUID) of a second job bringing said first computer device in said present computing state.

6. The method according to claim 1, wherein said step of detecting said state transition comprises the steps of:
reading and storing the system time of said first computer device at a first time;
reading the system time of said first computer device at a second time;
retrieving said stored system time from said first computer device;
if the time between said retrieved system time and said read system time deviates from a time interval defined by said first time and said second time;
retrieving an identifier of said previous computing state from said first computer device;
receiving an identifier of said present computing state from said second computer device;
comparing said identifiers of said previous computing state and said present computing state; and
signaling a state transition if said identifiers of said previous computing state and said present computing state are different.

7. The method according to claim 6, wherein said identifiers of said previous computing state and said present computing state are defined by a first unique job identifier (first JobGUID) of a first job bringing said first computer device in said previous computing state and a second unique job identifier (second JobGUID) of a second job bringing said first computer device in said present computing state.

8. The method according to claim 1, further comprising the step of storing said next momentary extreme set identifier at said first computer device.

9. The method according to claim 1, wherein said computing states are identified by job sequence numbers of a job sequence number range, the method comprising the step of assigning a first job sequence number to said previous computing state of said first set and a second job sequence number to a further computing state of said second set, said first job sequence number and second job sequence number beings successive numbers of said job sequence number range.

10. A non-transitory computer-readable storage medium containing a set of instructions that, when read by and executed by a processor of a computer device, performs a method of communicating computing states of a first computer device for registering said computing states by a second computer device, connected to said first computer device, said first computer device being configured to assume a plurality of successive computing states, said method comprising the steps of:
- communicating one or more computing states from said first computer device to said second computer device as a first set of computing states, said first set being identified by a first set identifier and containing a previous computing state;
- detecting by said first computer device a state transition from a present computing state to said previous computing state of said first computer device;
- requesting by said first computer device a momentary extreme set identifier of a sequence of set identifiers in response to detecting said state transition;
- receiving at said first computer device said momentary extreme set identifier from said second computer device;
- changing at said first computer device said momentary extreme set identifier to a next momentary extreme set identifier of said sequence of set identifiers;
- assigning further computing states of said first computer device to a second set of computing states, said second set being identified by said next momentary extreme set identifier and;
- transmitting said next momentary extreme set identifier, and said first set identifier of said first set to said second computer device; and
- communicating said further computing states of said second set to said second computer device.

11. A computing state registering system comprising a first computer device and a second computer device, wherein said first computer device is configured for assuming a plurality of successive computing states and is connectable to said second computer device, wherein said first computer device comprises:
- a communication module configured for communicating to said second computer device, one or more computing states of said first computer device as a first set of computing states, said first set containing a previous computing state and being identified by a first set identifier;
- a detector configured detecting a state transition from a present computing state to said previous computing state of said first computer device;
- a requesting module configured for requesting a momentary extreme set identifier of a sequence of set identifiers in response to detecting said state transition;
- a receiver configured for receiving said momentary extreme set identifier from said second computer device;
- a processing module programmed for changing said momentary extreme set identifier to a next momentary extreme set identifier of said sequence of set identifiers;
- a processing module programmed for assigning further computing states of said first computer device to a second set of computing states, said second set being identified by said next momentary extreme set identifier;
- a transmitter configured for transmitting said next momentary extreme set identifier, and said first set identifier of said first set to said second computer device; and
- a communication module configured for communicating said further computing states of said second set to said second computer device.

12. The system of claim 11, wherein said system further comprises a processing module configured for executing a method of communicating computing states of said first computer device for registering said computing states by said second computer device, connected to said first computer device, said first computer device being configured to assume a plurality of successive computing states, said method comprising the steps of:
- communicating one or more computing states from said first computer device to said second computer device as a first set of computing states, said first set being identified by a first set identifier and containing a previous computing state;
- detecting by said first computer device a state transition from a present computing state to said previous computing state of said first computer device;
- requesting by said first computer device a momentary extreme set identifier of a sequence of set identifiers in response to detecting said state transition;
- receiving at said first computer device said momentary extreme set identifier from said second computer device;
- changing at said first computer device said momentary extreme set identifier to a next momentary extreme set identifier of said sequence of set identifiers;
- assigning further computing states of said first computer device to a second set of computing states, said second set being identified by said next momentary extreme set identifier;
- transmitting said next momentary extreme set identifier, and said first set identifier of said first set to said second computer device; and
- communicating said further computing states of said second set to said second computer device.

13. A first computer device configured for executing a method of communicating computing states of said first computer device for registering said computing states by a second computer device, connected to said first computer device, said first computer device being configured to assume a plurality of successive computing states, said method comprising the steps of:
- communicating one or more computing states from said first computer device to said second computer device as a first set of computing states, said first set being identified by a first set identifier and containing a previous computing state;
- detecting by said first computer device a state transition from a present computing state to said previous computing state of said first computer device;
- requesting by said first computer device a momentary extreme set identifier of a sequence of set identifiers in response to detecting said state transition;
- receiving at said first computer device said momentary extreme set identifier from said second computer device;
- changing at said first computer device said momentary extreme set identifier to a next momentary extreme set identifier of said sequence of set identifiers;
- assigning further computing states of said first computer device to a second set of computing states, said second set being identified by said next momentary extreme set identifier and;
- transmitting said next momentary extreme set identifier, and said first set identifier of said first set to said second computer device; and
- communicating said further computing states of said second set to said second computer device.

14. A second computer device configured for registering computing states of a first computer device configured for executing a method of communicating computing states of said first computer device for registering said computing states by said second computer device, connected to said first computer device, said first computer device being configured to assume a plurality of successive computing states, said method comprising the steps of:

communicating one or more computing states from said first computer device to said second computer device as a first set of computing states, said first set being identified by a first set identifier and containing a previous computing state;

detecting by said first computer device a state transition from a present computing state to said previous computing state of said first computer device;

requesting by said first computer device a momentary extreme set identifier of a sequence of set identifiers in response to detecting said state transition;

receiving at said first computer device said momentary extreme set identifier from said second computer device;

changing at said first computer device said momentary extreme set identifier to a next momentary extreme set identifier of said sequence of set identifiers;

assigning further computing states of said first computer device to a second set of computing states, said second set being identified by said next momentary extreme set identifier and;

transmitting said next momentary extreme set identifier, and said first set identifier of said first set to said second computer device; and communicating said further computing states of said second set to said second computer device.

* * * * *